United States Patent [19]

Onizawa

[11] 4,069,214
[45] Jan. 17, 1978

[54] NOVEL CURABLE COMPOSITION

[75] Inventor: Masao Onizawa, Ohmiya, Japan

[73] Assignee: Sanyo Trading Co., Ltd., Tokyo, Japan

[21] Appl. No.: 786,673

[22] Filed: Apr. 11, 1977

[30] Foreign Application Priority Data

Apr. 16, 1976 Japan .................................. 51-42332

[51] Int. Cl.² ............................ C08F 8/00; C08F 8/32
[52] U.S. Cl. ..................................... 260/78 A; 526/49
[58] Field of Search ........................ 260/78 A; 526/49

[56] References Cited

U.S. PATENT DOCUMENTS

| 3,963,796 | 6/1976 | Yokono et al. | 260/78 A |
| 4,018,749 | 4/1977 | Onizawa | 260/78 A |
| 4,018,750 | 4/1977 | Onizawa | 260/78 A |

Primary Examiner—William F. Hamrock
Attorney, Agent, or Firm—Wenderoth, Lind & Ponack

[57] ABSTRACT

A curable composition consisting essentially of (a) an acrylic copolymer consisting of (1) a major proportion of at least one monomer selected from the group consisting of acrylic esters and methacrylic esters and (2) a minor proportion of another monomer copolymerizable therewith, and (b) at least one curing agent selected from the group consisting of lysine, ornithine, arginine, glutamine, asparagine, citrulline, cystine, hydroxylysine, and salts of these amino acids.

The composition is useful as a coating agent for metals, a bonding agent for plywood, a textile finishing agent, or a binder for non-woven fabrics.

3 Claims, 1 Drawing Figure

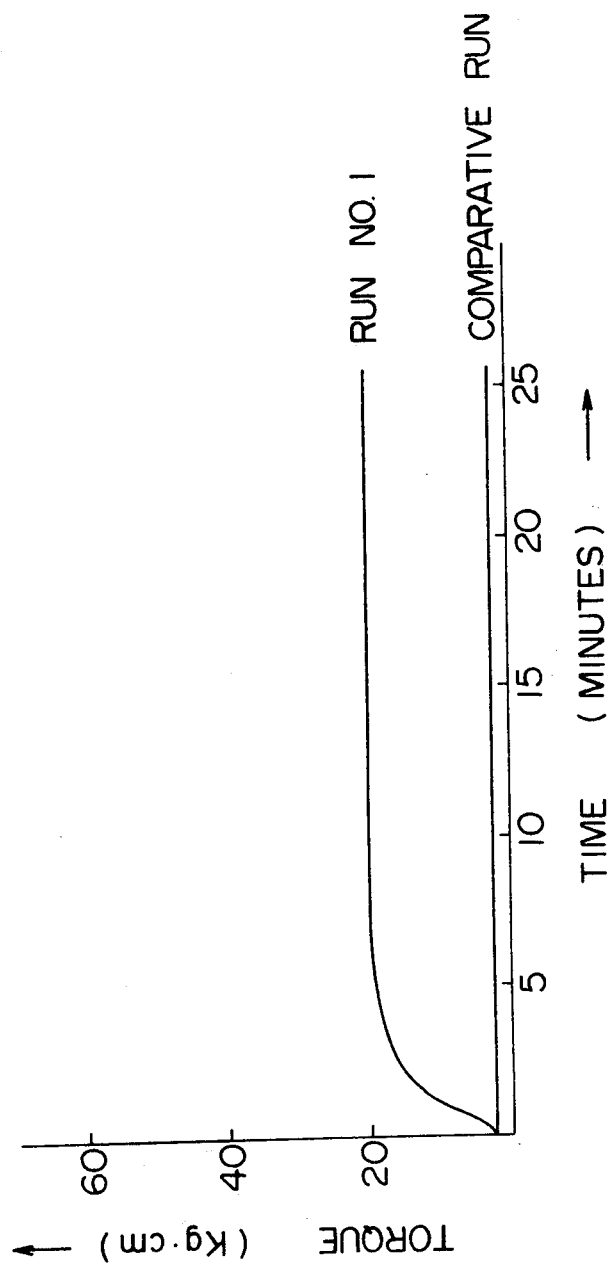

NOVEL CURABLE COMPOSITION

BACKGROUND OF THE INVENTION

This invention relates to a novel curable composition comprising an acrylic copolymer and a specified amino acid.

Acrylic copolymers composed of a major proportion of an acrylic ester and/or methacrylic ester and a minor proportion of another copolymerizable monomer have been well known, and found a wide range of application because of their superior weatherability, heat resistance and oil resistance.

The acrylic copolymers can take various forms such as hard resins, soft resins or rubbery elastomers by changing their ingredients, and are directed to uses suited to given types. For example, a hard resin consisting of methyl methacrylate as a main component and acrylic or methacrylic acid as a minor component is useful as a coating agent for metal containers of canned foods and furniture metals, or as a bonding agent for plywood. A soft resin composed of ethyl acrylate and methyl methacrylate as a major component and an acidic monomer such as itaconic acid, acrylic acid or methacrylic acid as a minor component is useful as a textile finishing agent or a binder for non-woven fabrics. On the other hand, a rubbery elastomer containing ethyl acrylate as a major component and chloroethyl vinyl ether as a minor component, and a rubbery elastomer containing a major proportion of ethyl acrylate or butyl acrylate and a minor proportion of glycidyl methacrylate and acrylonitrile are used as an oil seal or shaft seal.

In most cases, the acrylic copolymers are cured in order to improve their properties suitable for given uses, such as strength, wash resistance or solvent resistance, whether they are used in the form of a hard resin, soft resin or rubbery elastomer. The conventional practice for curing acrylic copolymers is to render them curable by using an acidic monomer such as acrylic, methacrylic or itaconic acid, an epoxy-containing monomer such as glycidyl acrylate, a monomer containing an ethyleneimine ring such as iminol methacrylate, a hydroxyl-containing monomer such as hydroxypropyl acrylate, or an amino-containing monomer such as acrylamide as a comonomer copolymerizable with the acrylic or methacrylic ester, and to cure them by heating with the use of suitable curing agents according to the imparted crosslinking reactivities of the acrylic copolymers.

Various curing agents have been suggested for this purpose. For the hard resins and soft resins, a precondensate of urea/formaldehyde and a precondensate of melamine/formaldehyde are most frequently used. However, since toxic amounts of formaldehyde are detected from acrylic copolymers cured with these curing agents, their use has recently been placed under rigorous statutory restrictions from the standpoint of pollution control.

When a self-curable comonomer such as N-methylol acrylamide is used the resulting acrylic copolymers can be cured without using curing agents. Toxic amounts of formaldehyde are also detected from the acrylic copolymers cured by this method, and the use of this self-curing method has also been rigorously restricted.

The rubber elastomeric acrylic copolymers, on the other hand, do not cure by the urea/formaldehyde precondensate or the melamine/formaldehyde precondensate. Most commonly used cured agents for the elastomers are, for examples, triethylene tetramine, hexamethylene diamine carbamate, and mercaptoimidazoline. These compounds are highly toxic, and in order to avoid pollution, the use of curing agents having little toxicity has been strongly desired.

With this background, the present inventor found novel curing agents for acrylic copolymers.

SUMMARY OF THE INVENTION

The present invention provides a curable composition comprising an acrylic copolymer composed of a major proportion of an acrylic ester and/or a methacrylic ester and a minor proportion of another monomer copolymerizable with the ester, and at least one curing agent selected from the group consisting of lysine, ornithine, arginine, glutamine, asparagine, citrulline, cystine, hydroxylysine, and salts of these amino acids. The present invention also provides a cured article of the composition.

DESCRIPTION OF THE DRAWING

The accompanying drawing shows the cure curve described in Example 1.

DETAILED DESCRIPTION OF THE INVENTION

The acrylic copolymer used in the composition of this invention is a copolymer composed mainly of an acrylic ester and/or a methacrylic ester. It contains 50 to 99.8 mole%, preferably 70 to 97 mole%, of one or both of these monomers, and the remainder is another monomer copolymerizable with the ester monomer.

The acrylic or methacrylic ester used in the present invention is expressed by the following general formula

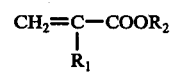

wherein $R_1$ represents a hydrogen atom or a methyl group, and $R_2$ represents an optionally substituted straight-chain or branched-chain alkyl group containing 1 to 18 carbon atoms, a cycloalkyl group, an aryl group or an aralkyl group.

Examples of the acrylic ester are methyl acrylate, ethyl acrylate, 2-chloroethyl acrylate, n-propyl acrylate, iso-ropyl acrylate, 3-chloro-2-hydroxypropyl acrylate, n-butyl acrylate, iso-butyl acrylate, sec-butyl acrylate, tert-butyl acrylate, n-pentyl acrylate, sec-pentyl acrylate, tert-pentyl acrylate, n-hexyl acrylate, 2-ethylbutyl acrylate, heptyl acrylate, n-octyl acrylate, 2-ethylhexyl acrylate, 3-ethylhexyl acrylate, 3,4-dimethylhexyl acrylate, 3-methylheptyl acrylate, 4-methylheptyl acrylate, 6-methylheptyl acrylate, 2-ethylheptyl acrylate, 3-ethylheptyl acrylate, 4-ethylheptyl acrylate, 2,3-dimethylheptyl acrylate, 3-methyloctyl acrylate, 6-methyloctyl acrylate, 3,5,5-trimethylhexyl acrylate, 3-ethyloctyl acrylate, 5-ethyloctyl acrylate, 2,3-dimethyloctyl acrylate, dodecyl acrylate, cetyl acrylate, octadecyl acrylate, β-hydroxyethyl acrylate, hydroxypropyl acrylate, butoxyethyl acrylate, tert-butylaminoethyl acrylate, cyclohexyl acrylate, phenyl acrylate, and benzyl acrylate. Examples of the methacrylate are methy methacrylate, ethyl methacrylate, n-propyl methacrylate, iso-propyl methacrylate, n-butyl methacrylate, iso-butyl methacrylate, sec-butyl methacrylate, tert-butyl methacrylate, n-pentyl methacrylate, sec-pentyl methacrylate, tert-pentyl methacrylate, n-hexyl methacrylate, 2-ethylbutyl methacrylate, heptyl methacrylate, n-octyl methacrylate, 2-ethylhexyl methacrylate, 3-ethylhexyl methacrylate, 3,4-dimethylhexyl methacrylate, 3-methylheptyl methacrylate, 4-methylheptyl methacrylate, 6-methylheptyl methacrylate, 2-ethylheptyl methacrylate, 3-ethylheptyl methacrylate, 4-ethylheptyl methacrylate, 2,3-dimethylheptyl methacrylate, 3-methyloctyl methacrylate, 6-methyloctyl methacrylate, 3,5,5-trimethylhexyl methacrylate, 3-ethyloctyl methacrylate, 5-ethyloctyl methacrylate, 2,3-dimethyloctyl methacrylate, dodecyl methacrylate, cetyl methacrylate, octadecyl methacrylate, β-hydroxyethyl methacrylate, cyclohexyl methacrylate, phenyl methacrylate, and benzyl methacrylate. Methacrylic esters containing a heterocyclic ring, such as N-[β-(α-methacryloxyacetamide)ethyl]-N,N'-ethyleneurea, can also be used.

Methyl acrylate, ethyl acrylate, butyl acrylate, 2-ethylhexyl acrylate, methyl methacrylate, ethyl methacrylate, and butyl methacrylate are the especially preferred acrylic or methacrylic esters used in the invention.

The ester monomer as a major component of the acrylic copolymer may be the acrylic ester alone, the methacrylic ester alone, or both of the acrylic and methacrylic esters. In the last case, the acrylic ester and the methacrylic ester can be used in all proportions. Generally, the choice of the acrylic ester and/or the methacrylic ester depends upon the type and end use of the final acrylic copolymer.

The monomer used as a minor component of the acrylic copolymer of this invention includes, for example, unsaturate monocarboxylic acids such as acrylic acid, methacrylic acid, 2-chloroacrylic acid, crotonic acid or cinnamic acid, and the amides or glycidyl esters of these unsaturated monocarboxylic acids; unsaturated dicarboxylic acids such as maleic acid, fumaric acid, itaconic acid or citraconic acid, and the monoamides, monoalkyl esters or monoglycidyl esters of these unsaturated dicarboxylic acids; glycidyl ethers such as vinyl glycidyl ether or allyl glycidyl ester; 2-(1-aziridinyl)ethyl methacrylate (or iminol methacrylate); chloroethyl vinyl ethers such as 2-chloroethylethylvinyl ether or dichloroethylvinyl ether; dienes such as chloroprene, butadiene, dimethyl butadiene or isoprene; and other unsaturated monomers such as vinyl acetate, vinyl chloride, vinylidene chloride, vinyl pyridine, methyl vinyl ketone, methyl isopropenyl ketone, tert-butyl acrylamide, acrylonitrile, α-methyl acrylonitrile, chloroacrylonitrile, styrene, α-methylstyrene, chlorostyrene, and mono(2-hydroxyethyl-α-chloroacrylate) acid phosphate. These monomers are used either alone or as mixtures of two or more. The monomer as a minor component is used to impart curability to the acrylic copolymer and to modify its various properties, such as hardness, strength, oxidation resistance or solubility, of the acrylic copolymer. Such a monomer as a minor component is known in the art.

The characteristic feature of the composition of the present invention is that it contains a curing agent which is at least one compound selected from the group consisting of amino acids of the class consisting of lysine, ornithine, arginine, hydroxylysine, glutamine, asparagine, citrulline and cystine, and salts of amino acids (basic amino acids) selected from lysine, ornithine, arginine and hydroxylysine with acids. The acids to form salts with lysine, ornithine, arginine or hydroxylysine may be either inorganic acids and organic acids. Especially preferred inorganic acids are hydrochloric acid or sulfuric acid, and especially suitable organic acids are acetic acid, glutamic acid and aspartic acid.

The total content of the amino acid or its salt in the composition of this invention is 0.1 to 30 parts by weight, preferably 0.5 to 10 parts by weight, per 100 parts by weight of the acrylic copolymer.

The curable composition of this invention may contain conventional additives, such as reinforcing agents, processing agents, pigments, softening agents, thickeners, emulsifiers, plasticizers and antioxidants, as needed.

The curable composition of this invention can be used in applications which the acrylic copolymers usually find. When the acrylic copolymer in the composition of this invention is a soft resin, the composition can be conveniently used as textile finishing agents for improving hand or imparting flexibility or water-proofness, a binder for non-woven fabrics or bonded fabrics, a binder for floc printing, and a binder for textile printing, and for the preparation of coated fabrics as a coating or laminate. When the acrylic copolymer is a hard resin, the composition can be used as a coating agent for metals, or a bonding agent for plywood. When it is a rubbery elastomer, the composition can be used as an oil seal or shaft seal. The use of the composition of the invention in these applications brings about the advantage that the evolution of formaldehyde can be completely avoided.

The conditions for curing the composition of this invention differ according to the end use of the composition. In any case, the curing can be performed under temperature and pressure conditions usually employed for a given utility. For example, when the acrylic copolymer in the composition of this invention is a soft resin and the composition is used as a hand improver for textiles, a fabric is dipped in an emulsion containing usually 5 to 30% by weight of the acrylic copolymer and a suitable amount of an amino acid curing agent, squeezed by a mangle, and then pre-dried at a temperature of 60° to 80° C, followed by curing at 130° to 150° C.

The following Examples illustrate the present invention. All parts in these examples are by weight.

The properties of cured acrylic copolymers were tested by the following methods.

Tensile Strength and Elongation

JIS-K 6301 using a Schopper type tensile tester at a tensile speed of 500 m/min.

Hardness

JIS-K 6301 using a JIS-A type hardness tester.

EXAMPLE 1

A composition shown in Table 1 and containing an acrylic copolymer (Primal B-15, a registered trademark) was prepared in a customary manner using mixing rolls. The composition was pre-cured at 180° C for 30 minutes using an electric hot press. The cured arylic copolymer was post-cured for 3 hours in an oven kept at 180° C. The properties of the resulting cured acrylic copolymer are shown in Table 1.

For comparison, a composition containing no amino acid was prepared, heat-treated, and tested in the same way.

Table 1

| | Run No. 1 | Comparative Run |
|---|---|---|
| Formulation of the composition (parts) | | |
| Acrylic polymer (*1) | 100 | 100 |
| SRF-L carbon black (*2) | 40 | 40 |
| TE-58A (*3) | 2.5 | 2.5 |
| 50% Aqueous solution of lysine | 2.5 | — |
| Properties of the cured acrylic copolymer | | |
| Tensile strength (Kg/cm$^2$) | 85 | —(*4) |
| Elongation (%) | 110 | — |
| Hardness | 45 | — |

Note
(*1): A solid soft resin obtained by sufficiently drying at room temperature Primal B-15 (a registered trademark for an acrylic copolymer made by Rohm & Haas Co.; an aqueous emulsion containing 46% by weight of an acrylic copolymer of the soft resin type containing methyl methacrylate and a lower alkyl ester of acrylic acid as main ingredients).
(*2): Semi-reinforcing furnace low structure carbon black added as a reinforcing agent.
(*3): A product of Technical Processing Company, which is an alkali metal salt of a higher fatty acid and added as a roll-operability improver.
(*4): The properties of the composition in the comparative run could not be measured since it did not cure.

The cure curves at 180° C of the compositions in Run No. 1 and Comparative Run were measured by means of a JSR-type curelastometer, and are shown in the accompanying drawing.

It is seen from Table 1 and the accompanying drawing that the acrylic copolymer can be well cured with lysine, but mere heating of the acrylic copolymer to 180° C in the absence of a curing agent does not induce curing.

EXAMPLE 2

Compositions having the formulations shown in Table 2 were prepared and cured in the same way as in Example 1. The properties of the cured acrylic copolymers are shown in Table 2.

Cure curves of these compositions determined by a curelastometer is the same way as in Example 1 also led to the confirmation that the acrylic copolymers (To a acron AR 715, a registered trademark) containing butyl acrylate as a main ingredient can be cured with glutamine and ornithine.

Table 2

| | Run No. 1 | Run No. 2 |
|---|---|---|
| Formulation of the composition (parts) | | |
| Acrylic copolymer (*1) | 100 | 100 |
| SRF-L carbon black (*2) | 40 | 40 |
| Stearic acid (*3) | 1 | 1 |
| TE-58A (*4) | 2.5 | 2.5 |
| Glutamine | 2.5 | — |
| 50% Aqueous solution of ornithine | — | 2.5 |
| Properties of the cured acrylic copolymer | | |
| Tensile strength (Kg/cm$^2$) | 79 | 68 |
| Elongation (%) | 360 | 190 |
| Hardness | 37 | 44 |

Note
(*1): Toa acron AR 715 (a registered trademark for a solid rubbery acrylic copolymer containing butyl acrylate as a main component, a product of Toa Paint Co., Ltd.)
(*2) and (*4): Same as the footnote to Table 1.
(*3): Added to improve roll-processability.

EXAMPLE 3

Compositions having the formulations indicated in Table 3 were prepared, and cured in the same way as in Example 1.

The properties shown in Table 3 demonstrate that the acrylic copolymer used in this Example (Toa acron AR 601) can be cured with lysine, ornithine and asparagine. This was also confirmed by the cure curves of these compositions measured by a curelastometer in the same way as in Example 1.

Table 3

| | Run No. 1 | Run No. 2 | Run No. 3 |
|---|---|---|---|
| Formulation of the composition (parts) | | | |
| Acrylic copolymer (*1) | 100 | 100 | 100 |
| SRF-L carbon black (*2) | 40 | 40 | 40 |
| Stearic acid (*3) | 1 | 1 | 1 |
| TE-58A (*4) | 2.5 | 2.5 | 2.5 |
| 50% Aqueous solution of lysine | 2.5 | — | — |
| 50% Aqueous solution of ornithine | — | 2.5 | — |
| Asparagine | — | — | 2.5 |
| Properties of the cured acrylic copolymer | | | |
| Tensile strength (kg/cm$^2$) | 100 | 96 | 59 |
| Elongation (%) | 160 | 160 | 340 |
| Hardness | 56 | 50 | 41 |

Note
(*1): Toa acron AR 601 (a registered trademark for a solid rubbery acrylic copolymer composed mainly of ethyl acrylate, a product of Toa Paint Co., Ltd.).
(*2) and (*4): Same as the footnote to Table 1.
(*3): Same as the footnote to Table 2.

EXAMPLE 4

This Example shows that acrylic copolymers containing butyl acrylate as a main component Noxtite 212, a registered trademark; and Nipol AR 31, a registered trademark), which are of different types from that used in Example 1, can be cured with lysine, ornithine and a mixture of lysine and arginine. The compositions were prepared and cured in the same way as in Example 1. The formulations and the properties of the cured acrylic copolymers are shown in Table 4.

The properties shown in Table 4 demonstrate that the acrylic copolymer used in this Example can be cured with amino acids. This was further confirmed by the cure curves of the compositions determined by a curelastometer in the same way as in Example 1.

Table 4

| Run No. | 1 | 2 | 3 | 4 | 5 |
|---|---|---|---|---|---|
| Formulation of the composition (parts) | | | | | |
| Acrylic copolymer (*1) | 100 | 100 | 100 | 100 | 100 |
| SRF-L carbon black (*2) | 40 | 40 | 40 | 40 | 40 |
| Stearic acid (*3) | 1 | 1 | 1 | 1 | 1 |
| TE-58A (*4) | 2.5 | 2.5 | 1 | 2.5 | 2.5 |
| 50% Aqueous solution of lysine | 2.5 | — | 2.5 | 2.5 | — |
| 50% Aqueous solution of ornithine | — | 2.5 | — | — | 2.5 |
| Arginine | — | — | 2.5 | — | — |
| Properties of the cured acrylic copolymer | | | | | |
| Tensile strength (kg/cm$^2$) | 61 | 62 | 61 | 89 | 81 |
| Elongation (%) | 320 | 390 | 170 | 180 | 220 |
| Hardness | 36 | 35 | 46 | 50 | 48 |

Note
(*1): In Runs Nos. 1, 2 and 3, Noxtite 212 (a registered trademark for a solid rubbery acrylic copolymer composed mainly of butyl acrylate, a product of Nippon Oil Seal Kogyo Kabushiki Kaisha) was used; and in Runs Nos. 4 and 5, Nipol AR 31 (a registered trademark for a solid rubbery acrylic copolymer containing butyl acrylate as a main component, a product of Nippon Zeon Co., Ltd.) was used.
(*2) and (*4): Same as the footnote to Table 1.
(*3): Same as the footnote to Table 2.

EXAMPLE 5

An acrylic copolymer containing ethyl acrylate as a main component was prepared by thr emulsion polymerization process described below.

A three-necked flask equipped with a reflux condenser and a stirrer was charged with 770 parts of water, 30 parts of Triton X-720 (a registered trademark) and 10 parts of Triton X-100 (a registered trademark) as emulsifiers (these two are emulsifiers sold by Rohm & Haas Co.), and with good stirring by the stirrer, the temperature of the mixture within the flask was adjusted to 75° C. Potassium persulfate (0.13 parts) as an initiator was dissolved in 65 parts of water. 15 Parts of the resulting aqueous solution was introduced into the flask, and nitrogen gas was passed through the flask to replace the air in it by the nitrogen gas. On the other hand, a uniform mixture consisting of 950 parts of ethyl acrylate free from an inhibitor and 50 parts of 2-chloroethyl vinyl ether was prepared. 100 Parts of the monomeric mixture was introduced into the flask, and polymerization was started. The reaction was continued until the temperature of the reaction mixture rose by the heat of reaction and reached 84° C. Then, the remaining monomeric mixture was continuously added over the course of 3 hours, and the remaining aqueous solution of the initiator was added in an amount of 10 parts every 30 minutes. The polymerization was further continued, and during this time, the temperature of the reaction mixture was maintained within the range of 86° to 92° C. The resulting ethyl acrylate/2-chloroethyl vinyl ether copolymer emulsion had a solids content of 49.4%. The emulsion was subjected to salting-out, and then sufficiently washed and dried to afford a solid acrylic copolymer.

Compositions containing the solid acrylic copolymer according to the formulations shown in Table 5 were prepared, and cured in the same way as in Example 1. The properties of the resulting cured acrylic copolymers are shown in Table 5.

Table 5

|  | Run No. 1 | Run No. 2 | Run No. 3 |
| --- | --- | --- | --- |
| Formulation of the composition (parts) |  |  |  |
| Acrylic copolymer (*1) | 100 | 100 | 100 |
| SRF-L carbon black (*2) | 40 | 40 | 40 |
| TE-58A (*3) | 2.5 | 2.5 | 2.5 |
| 50% Aqueous solution of lysine | 2.5 | — | 2.5 |
| 50% Aqueous solution of ornithine | — | 2.5 | — |
| Arginine | — | — | 2.5 |
| Properties of the cured acrylic copolymer |  |  |  |
| Tensile strength (kg/cm$^2$) | 91 | 91 | 111 |
| Elongation (%) | 390 | 410 | 220 |
| Hardness | 69 | 68 | 77 |

Note
(*1): The acrylate copolymer containing ethyl acrylate as a main component which was obtained by the above procedure.
(*2) and (*3): Same as the footnote to Table 1.

EXAMPLE 6

This Example shows the finishing of a textile fabric using an acrylic copolymer.

Water (1200 parts) was added to 150 parts of the aqueous emulsion of acrylic copolymer (Primal B-15) used in Example 1 to dilute it. An aqueous solution of 2 parts of lysine hydrochloride in 150 parts of water was added to the diluted solution to prepare a treating solution. Three knit fabric sheets, each with a size of 30 square centimeters, made of cotton, acrylic fibers, and polyester fibers respectively were each dipped in the treating solution. The excess of the treating solution was removed by a centrifugal dehydrator until the weight of each fabric impregnated with the treating solution became twice as large as the initial weight of the fabric. Each of the fabrics was air dried at room temperature for 1 hour, and then cured for 2 minutes in an air oven kept at 170° C.

The fabrics so treated had good appearance and hand.
Similar results were obtained when arginine hydrochloride or ornithine hydrochloride was used instead of the lysine hydrochloride in the above procedure.

What is claimed is:
1. A curable composition consisting essentially of
   a. an acrylic copolymer consisting of (1) a major proportion of at least one monomer selected from the group consisting of acrylic esters and methacrylic esters and (2) a minor proportion of another monomer copolymerizable therewith, and
   b. at least one curing agent selected from the group consisting of lysine, ornithine, arginine, glutamine, asparagine, citrulline, cystine, hydroxylysine, and salts of these amino acids.
2. The composition of claim 1 wherein the acrylic copolymer consists of 50 to 99.8 mole% of the monomer (1) and the remainder being the monomer (2).
3. The composition of claim 1 wherein the amount of the curing agent is 0.1 to 30 parts by weight per 100 parts by weight of the acrylic copolymer.

* * * * *